(12) United States Patent
Szarski et al.

(10) Patent No.: US 10,646,930 B2
(45) Date of Patent: May 12, 2020

(54) SYSTEM AND METHOD FOR PRECISELY DRILLING MATCHED HOLE PATTERNS USING SURFACE MAPPED FEATURES

(71) Applicant: The Boeing Company, Chicago, IL (US)

(72) Inventors: Martin A. Szarski, Port Melbourne (AU); Luke Fletcher, Melbourne (AU)

(73) Assignee: THE BOEING COMPANY, Chicago, IL (US)

(*) Notice: Subject to any disclaimer, the term of this patent is extended or adjusted under 35 U.S.C. 154(b) by 229 days.

(21) Appl. No.: 15/423,806

(22) Filed: Feb. 3, 2017

(65) Prior Publication Data
US 2018/0221966 A1 Aug. 9, 2018

(51) Int. Cl.
| B23B 35/00 | (2006.01) |
|---|---|
| B23B 39/08 | (2006.01) |
| G05B 19/404 | (2006.01) |
| G05B 19/402 | (2006.01) |
| B23B 49/02 | (2006.01) |
| B23B 39/06 | (2006.01) |
| B64F 5/10 | (2017.01) |

(52) U.S. Cl.
CPC ............ *B23B 39/08* (2013.01); *B23B 35/00* (2013.01); *B23B 39/06* (2013.01); *B23B 49/02* (2013.01); *G05B 19/402* (2013.01); *G05B 19/404* (2013.01); *B23B 2260/128* (2013.01); *B64F 5/10* (2017.01); *G05B 2219/45129* (2013.01)

(58) Field of Classification Search
CPC ......... B23B 39/08; B23B 39/06; B23B 35/00; B23B 49/02; B23B 2260/128; B64F 5/10; G05B 19/404; G05B 19/402; G05B 2219/45129
See application file for complete search history.

(56) References Cited

U.S. PATENT DOCUMENTS

| 6,472,676 B1 * | 10/2002 | Douglas ............... G05B 19/401 250/208.1 |
|---|---|---|
| 8,899,886 B1 * | 12/2014 | Castle ..................... B23B 49/00 408/1 R |
| 8,922,647 B2 | 12/2014 | Crothers et al. |
| 2013/0033596 A1 | 2/2013 | Crothers et al. |

(Continued)

*Primary Examiner* — Sunil K Singh
*Assistant Examiner* — Paul M Janeski
(74) *Attorney, Agent, or Firm* — Moore IP Law

(57) ABSTRACT

A system and method is disclosed for performing matched drilling operations on mating first and second workpieces. A microscopic camera is mounted on a movable spindle holding a tool. A micro-adjustment mechanism on the spindle controllable moves the tool. A template is provided that is mounted to the first workpiece and to the second workpiece. A controller receives images of the template from the microscopic camera at each of the predetermined positions on the first workpiece and identifies microscopic features on the template associated with each of the predetermined positions on the first workpiece. The controller compares microscopic features within received images of the template at each of the predetermined positions on the second workpiece associated with microscopic features of a corresponding image of the first workpiece to calculate a necessary offset adjustment that is applied to the micro-adjustment mechanism before each operation on the second workpiece.

20 Claims, 3 Drawing Sheets

(56) References Cited

U.S. PATENT DOCUMENTS

2014/0172152 A1   6/2014  Bain et al.
2015/0007634 A1   1/2015  Wallace
2015/0153728 A1   6/2015  Eckley
2015/0323922 A1  11/2015  Fletcher et al.
2016/0116905 A1   4/2016  Szarski et al.

* cited by examiner

SYSTEM AND METHOD FOR PRECISELY DRILLING MATCHED HOLE PATTERNS USING SURFACE MAPPED FEATURES

FIELD

This disclosure relates generally to a system and method for precisely drilling matched hole patterns using surface mapped features.

BACKGROUND

During the manufacture of products, particularly large products such as aircraft, assembly holes must be drilled in two workpieces to be mated together. There are two general techniques for drilling holes in such workpieces. In the first technique, the holes may be separately drilled in each workpiece and then the separate workpieces are mated together for assembly. This technique can introduce errors with alignment, size, and/or orientation when the layers are assembled together. These errors can be caused by a lack of precision in the device used to drill such holes, e.g., a computer numerical control ("CNC") machine or a computer-controlled robot arm.

In the second technique, called match drilling, the two workpieces are temporarily fastened together and each hole is drilled once through the two mated workpieces. The workpieces are then disassembled for deburr and inspection before being reassembled and fastened permanently. This process is very time consuming, particularly when the workpieces are large parts, e.g., aircraft parts, because the workpieces must be assembled twice for a single join.

Accordingly, there is a need for an improved system and method for precisely drilling holes in mating workpieces which overcomes the problems identified above.

SUMMARY

In a first aspect, a system is disclosed for performing matched operations on mating first and second workpieces. A movable spindle has a chuck for holding a tool for performing an operation. A microscopic camera is mounted on the spindle. A template is adapted to be mounted to the first workpiece and the second workpiece. A controller provides signals to move the movable spindle to a series of predetermined positions on the first workpiece for performing operations at each of the predetermined positions when operating on the first workpiece. The controller receives images of the template from the microscopic camera at each of the predetermined positions on the first workpiece and identifies and stores in a memory microscopic features on the template associated with each of the predetermined positions on the first workpiece.

In a further embodiment, the movable spindle may be part of a computer numerical control machine or a computer-controlled robot arm system. Further, the matched operations may be matched drilling operations. Still further, the controller may provide signals to move the movable spindle to a series of predetermined positions on the second workpiece for performing operations at each of the predetermined positions when operating on the second workpiece. Also, the controller may receive an image of the template from the microscopic camera at each of the predetermined positions on the second workpiece and, at each of the predetermined positions on the second workpiece, compare microscopic features within the received image of the template associated with microscopic features in a stored version of an image of the template associated with a corresponding predetermined position on the first workpiece to calculate a necessary offset adjustment. The system may include a micro-adjustment mechanism mounted on the spindle for controllably moving the tool installed in the chuck on the movable spindle. The controller may provide a signal to the micro-adjustment mechanism to move the tool installed in the chuck on the movable spindle by an amount of the identified offset adjustment. Finally, the controller may adjust the calculated the necessary offset adjustment based on a temperature differential of the template when mounted to the first workpiece and when mounted to the second workpiece.

In a second aspect, a system for performing matched operations on mating first and second workpieces is disclosed. A movable spindle has a chuck for holding a tool for performing an operation. A microscopic camera is mounted on the spindle. A micro-adjustment mechanism is mounted on the spindle for controllably moving the tool installed in the chuck on the movable spindle. A template is adapted to be mounted to the first workpiece and the second workpiece. A controller provides signals to move the movable spindle to a series of predetermined positions on the second workpiece for performing operations at each of the predetermined positions when operating on the second workpiece. The controller receives an image of the template from the microscopic camera at each of the predetermined positions on the second workpiece and, at each of the predetermined positions on the second workpiece, compares microscopic features within the received image of the template associated with microscopic features in a version of an image of the template associated with a corresponding predetermined position on the first workpiece stored in a memory to calculate a necessary offset adjustment. The controller provides a signal to the micro-adjustment mechanism to move the tool installed in the chuck on the movable spindle by an amount of the identified offset adjustment.

In a further embodiment, the movable spindle may be part of a computer numerical control machine or a computer-controlled robot arm system. Further, the matched operations may be matched drilling operations. Still further, the controller may provide signals to move the movable spindle to a series of predetermined positions on the first workpiece for performing operations at each of the predetermined positions when operating on the first workpiece. Also, the controller may receive images of the template from the microscopic camera at each of the predetermined positions on the first workpiece and identify and store in memory the microscopic features on the template associated with each of the predetermined positions on the first workpiece. Finally, the controller may adjust the calculated necessary offset adjustment based on a temperature differential of the template when mounted to the first workpiece and when mounted to the second workpiece.

In a third aspect, a method is disclosed for performing matched operations on mating first and second workpieces. A template is mounted on the first workpiece. A first spindle having a first chuck for holding a first tool for performing an operation is moved to a series of predetermined positions on the first workpiece and operations are performed on the first workpiece at each of the predetermined positions. An image of the template mounted to the first workpiece is captured using a microscopic camera mounted on the first spindle at each of the predetermined positions. Microscopic features on the template associated with each of the predetermined positions on the first workpiece are identified and stored in memory.

In a further embodiment, the template may be mounted on the second workpiece. A second spindle having a second chuck for holding a second tool for performing an operation may be moved to a series of predetermined positions on the second workpiece. An image of the template may be captured using a microscopic camera mounted on the second spindle at each of the predetermined positions. Microscopic features on the template associated with each of the predetermined positions on the second workpiece may be identified. Still further, the identified microscopic features on the template associated with each of the predetermined positions on the second workpiece may be compared with microscopic features in a stored version of an image of the template associated with a corresponding predetermined position on the first workpiece to identify a necessary offset adjustment at each of the predetermined positions on the second workpiece. Also, signals may be provided to a micro-adjustment mechanism mounted on the second spindle for controllably moving the second tool installed in the second chuck on the second spindle to move the tool by an amount of the identified offset adjustment at each of the predetermined positions on the second workpiece. Operations may be performed at each of the predetermined positions on the second workpiece. Finally, the calculated necessary offset adjustment may be adjusted based on a temperature differential of the template when mounted to the first workpiece and when mounted to the second workpiece In a fourth aspect, a method is disclosed for performing matched operations on mating first and second workpieces. A template is mounted on the second workpiece. A spindle having a chuck for holding a tool for performing an operation is moved to a series of predetermined positions on the second workpiece. An image of the template is captured using a microscopic camera mounted on the spindle at each of the predetermined positions. Microscopic features on the template associated with each of the predetermined positions on the second workpiece are identified. The identified microscopic features on the template associated with each of the predetermined positions on the second workpiece are compared with microscopic features in a stored version of an image of the template associated with a corresponding predetermined position on the first workpiece to identify a necessary offset adjustment at each of the predetermined positions on the second workpiece. Signals are provided to a micro-adjustment mechanism mounted on the spindle for controllably moving the tool installed in the chuck on the movable spindle to move the tool by an amount of the identified offset adjustment at each of the predetermined positions on the second workpiece. Operations are performed at each of the predetermined positions on the second workpiece.

In a further embodiment, the spindle may be part of a computer numerical control machine or a computer-controlled robot arm system. In addition, the matched operations may be matched drilling operations.

The features, functions, and advantages that have been discussed can be achieved independently in various embodiments or may be combined in yet other embodiments, further details of which can be seen with reference to the following description and drawings.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

The system and method disclosed herein employs a microscopic camera, i.e., a microscope vision system capable of providing micron resolution, that is affixed to a spindle of a computer numerical control ("CNC") machine or a computer-controlled robot arm. At each drill point on a first workpiece, the microscopic camera records an image on an associated metal template (e.g., a tool jig) attached to the first workpiece, e.g., via determinant assembly procedures such as tension holes. Because the microscopic grain structure of the template vary significantly across the surface thereof, the textures within each recorded image can be used to provide a "fingerprint" that can be used to identify the associated drill location. The template can then be removed and precisely mounted on an associated second workpiece in the same manner (i.e., via determinant assembly procedures such as tension holes). At each drill point on the second workpiece, an image from the microscopic camera is processed to determine if the spindle is positioned within the desired level of precision. If such processing determines that the spindle is not positioned within the desired level of precision (i.e., an offset if found between the actual and desired positions of the spindle), a micro adjustment mechanism attached to the spindle is activated to move the spindle into a position that is within the desired level of precision. The processing performed can take temperature into account, correcting for thermal expansion of the template as necessary.

Figure 1:
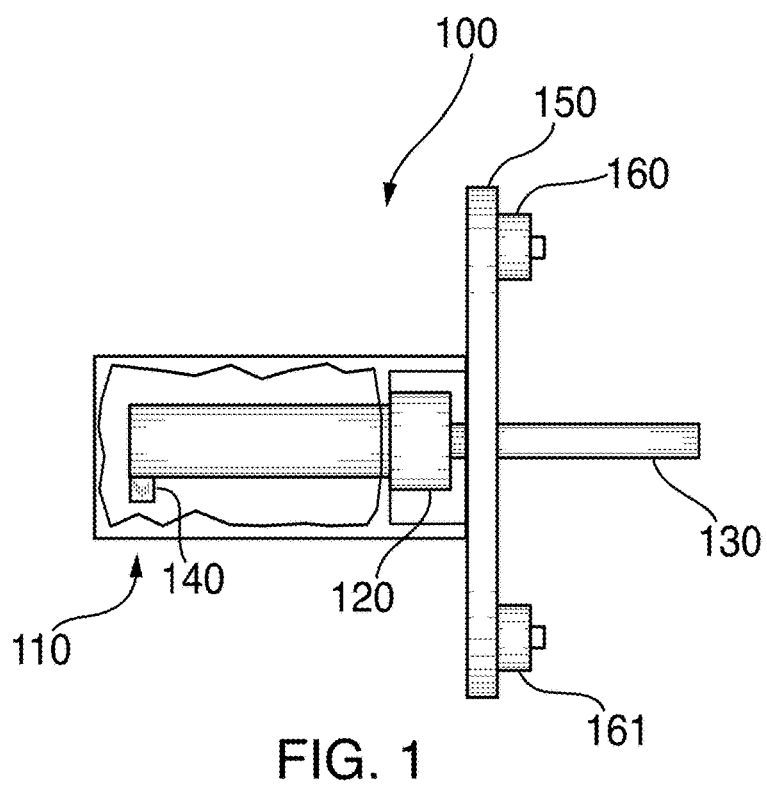
FIG. 1 is a diagram of a texture tracking spindle assembly according to an embodiment of the present disclosure.

FIG. 1 shows a spindle assembly 100 for use in the texture tracking system and method of the present disclosure. Spindle assembly 100 includes a spindle 110 having a chuck 120 for receiving and holding a tool 130. Tool 130 may be a bit for drilling or a cutter for milling, for example. Spindle 110 is preferably part of a CNC machine or computer-controlled robot arm, but can be part of any type of computer-controlled mechanism for drilling holes (or other machining operations). A mounting collar 150 is affixed to spindle 110, and microscopic cameras 160, 161 are affixed to mounting collar 150. Although two microscopic cameras 160, 161 are shown in FIG. 1, only a single microscopic camera (e.g., camera 160) is required to perform the method of this disclosure and in some further embodiments additional cameras may be employed as well. Each microscopic camera 160, 161 is a camera including optics which allow the camera to observe the surface of a template attached to the workpiece being operated upon (e.g., drilled or machined) at a high resolution (e.g., one micron) that allows a view of the microscopic textures of that template. Because each metallic surface includes striations and other microscopic features (collectively "textures") which are unique to that surface, the textures can be used as a fingerprint to precisely locate a position on that template. A micro-adjustment mechanism 140 is also included within spindle 110. Micro-adjustment mechanism 140 controllably moves tool 130 in an x and y direction as required to adjust for any offset found when the spindle 110 is positioned for operation on the second workpiece. Micro-adjustment mechanism 140 may be, for example, a micro-hydraulic bellows, piezoelectric actuators, a set of linear motors, or conventional drives with high gear ratios.

Figure 2:
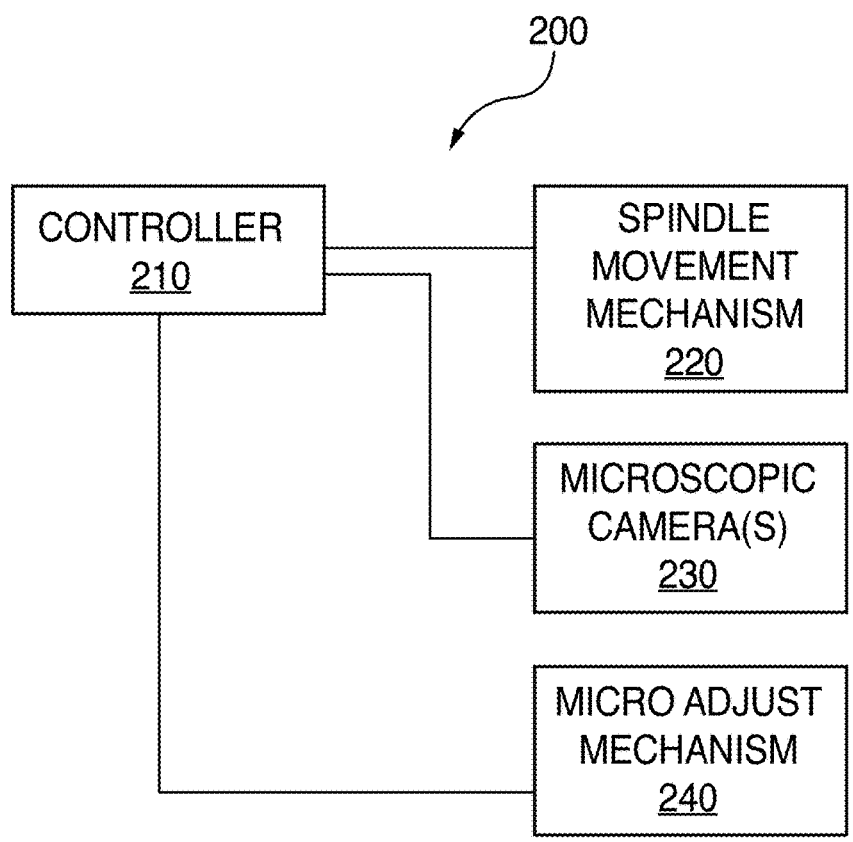
FIG. 2 is a block diagram of a system for drilling holes in workpieces based on texture tracking according to an embodiment of the present disclosure.

Referring now to FIG. 2, a texture tracking control system 200 is shown for use with the system and method of the present disclosure. A controller 210 is coupled to a spindle movement mechanism 220 in a CNC machine or computer-controlled robot arm to control conventional movement of spindle 110. Controller 210 is also coupled to one or more microscopic cameras 230 and to a micro-adjustment mechanism 240. Controller 210 may be, for example, the main controller or computer used in the associated CNC machine or computer-controlled robot arm. In some cases, the conventional functions provided by controller 210 with respect to moving spindle 110 (e.g., moving spindle 110 to a series of programmed drill positions) may be performed by a first computer or controller (coupled to spindle movement mechanism 220) and the functions provided with respect to texture tracking according to the present disclosure may be performed by a second computer or controller coupled to the first controller (and also coupled to microscopic cameras 230 and micro-adjustment mechanism).

Figure 3:
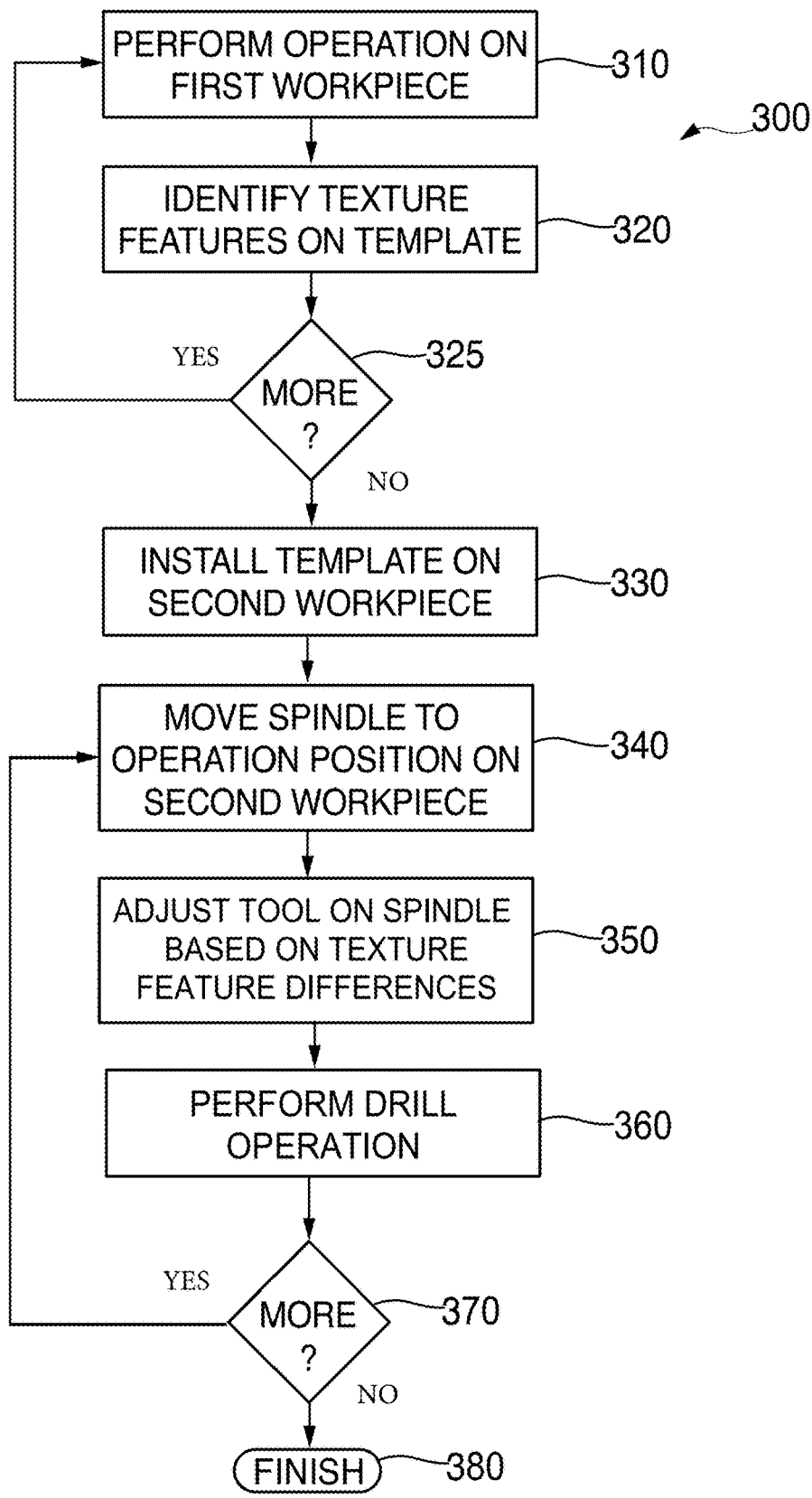
FIG. 3 is flowchart of a method for drilling holes in workpieces based on texture tracking according to an embodiment of the present disclosure.

Referring now to FIG. 3, a flowchart 300 is provided showing the steps performed according to a presently preferred embodiment of the present disclosure. At step 310, an operation is performed on a first workpiece (e.g., a drilling operation). In particular, controller 210 controls spindle movement mechanism 220 to move spindle 110 to the appropriate predetermined position and the desired operation is performed. At step 320, the image (or images) of the template mounted on the first workpiece provided by each microscopic camera 230 are processed by controller 210 to identify particular texture features therein (controller 210 essential generates a "fingerprint" on the template of the current spindle location). At step 325, processing loops back to step 310 if additional operations (e.g., drills) are required on the first workpiece. Once all the operations on the first workpiece are complete, processing moves to the second workpiece. The template is installed on the second workpiece at step 330. Then, the spindle 110 is moved to an operation position at step 340. Next, at step 350, controller 210 receives an image of the template, compares the texture features in the received image with the texture features in the stored image for the current operation position, determines the amount of adjustment (if any) required for the tool installed on spindle 110 based on the differences between the texture features in the received image and the texture features in the stored image for the current operation position, and provides a signal to the micro-adjustment mechanism 240 to move the tool by the desired amount of adjustment (e.g., a particular amount in the x and y directions). In addition, controller 210 may apply a correction factor based on temperature differences between the temperature when the initial image was captured and the temperature when the second image is captured (i.e., during the operation on the second workpiece) when calculating the adjustment amount. Once the tool position is adjusted, the operation (e.g., a drill operation) is performed at step 360. At step 370, processing loops back to step 340 if additional operations (e.g., drills) are required on the second workpiece. Once all the operations are completed, processing ends at step 380. Preferably, the controller may be configured to provide a signal to cause a tool installed in a chuck on the movable spindle to move by an amount of the identified offset adjustment at each of the predetermined positions to perform drill operations on the second workpiece to approximately match the predetermined positions for the drill operations on the first workpiece.

Figure 4:
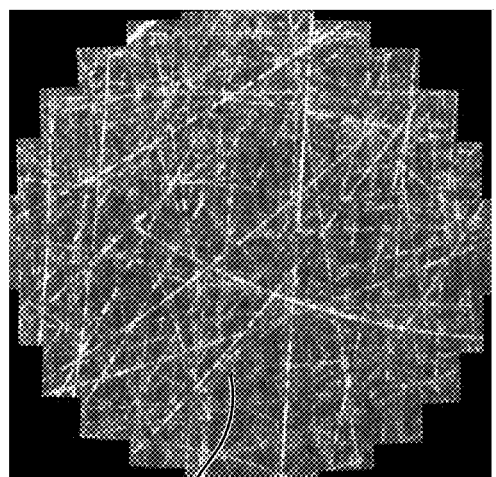
FIG. 4 is a drawing showing the texture features of a saved location according to an embodiment of the present disclosure.
Figure 5:
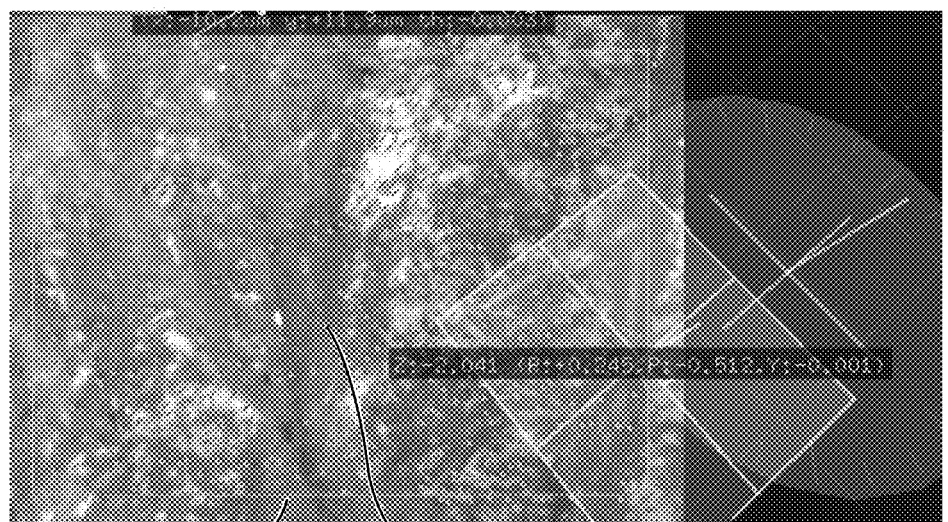
FIG. 5 is a drawing showing mapped texture features of a saved location according to an embodiment of the present disclosure.

Referring now to FIG. 4, a drawing 400 shows the various features that can be seen in a microscopic view of a metal surface. Since each position on the metal surface will have different features, such features can be used as a fingerprint to determine, with a high level of accuracy, position information relative to a previously identified position on the same metal surface. In FIG. 5, an image 500 is shown in which a plurality of features 510 have been identified. The collection of features 510 constitutes a "fingerprint" of that image that can be used, when comparing image 500 to a later captured image, to obtain relative positional information.

The system and method disclosed herein provides the ability to improve quality (by more precisely drilling holes in mating parts) and provide cost savings (by eliminating the need disassemble mating parts for cleaning and deburr after perform drill operations are performed with the mating parts assembled together). In addition, the present system and method allows mating parts to be manufactured and drilled at different locations, with only the template having to be shipped from one location to the other. Further, the system and method of the present disclosure can be implemented by upgrading existing CNC machines or computer-controlled robot arm systems to include a spindle assembly including one or more microscopic camera(s) and micro-adjustment mechanism, with appropriate software upgrades to the associated computing system.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A system for performing matched operations on a first workpiece and a second workpiece, the system comprising:
   a movable spindle having a chuck for holding a tool;
   a microscopic camera mounted on the movable spindle; and
   a controller configured to:
     provide signals to move the movable spindle to a series of predetermined positions for performing operations on the first workpiece;
     receive, from the microscopic camera at each of the predetermined positions, an image of a template mounted to the first workpiece;
     identify and store microscopic features of the template associated with each of the predetermined positions;
     perform a comparison of the microscopic features with second microscopic features identified in a second image of the template mounted to the second workpiece; and
     responsive to the comparison indicating a distance between the microscopic features and the second microscopic features that does not satisfy a threshold distance, provide second signals to move the movable spindle such that the threshold distance is satisfied.

2. The system of claim 1, wherein the movable spindle is part of a computer numerical control machine or a computer-controlled robot arm system.

3. The system of claim 1, wherein the controller is further configured to provide signals to move the movable spindle to a series of predetermined positions for performing operations on the second workpiece.

4. The system of claim 3, wherein the controller is further configured to receive, from the microscopic camera at each of the predetermined positions, an image of the template mounted on the second workpiece, and wherein performing the comparison is configured to identify when there is more than a predetermined distance between relative positions of the stored microscopic features and the second microscopic features in the second image, in response to which the controller provides second signals to move the movable spindle.

5. The system of claim 4, wherein the controller is further configured to identify a temperature differential of the template when mounted to the first workpiece and when mounted to the second workpiece wherein the distance between the microscopic features and the second microscopic features is determined based on the temperature differential.

6. The system of claim 1, wherein the matched operations comprise matched drilling operations.

7. A system for performing matched operations on a first workpiece and a second workpiece, the system comprising:
a movable spindle having a chuck for holding a tool;
a microscopic camera mounted on the movable spindle;
a micro-adjustment mechanism mounted on the movable spindle and configured to controllably move the tool installed in the chuck on the movable spindle; and
a controller configured to:
provide signals to move the movable spindle to a series of predetermined positions for performing operations on the second workpiece;
receive, from the microscopic camera at each of the predetermined positions, an image of a template mounted to the first workpiece;
identify microscopic features of the template associated with each of the predetermined positions;
perform a comparison of the microscopic features with second microscopic features identified in a second image of the template mounted to the second workpiece; and
responsive to the comparison indicating a distance between the microscopic features and the second microscopic features that does not satisfy a threshold distance, provide second signals to move the movable spindle via the micro-adjustment mechanism such that the threshold distance is satisfied.

8. The system of claim 7, wherein the movable spindle is part of a computer numerical control machine or a computer-controlled robot arm system, and wherein the controller is configured to perform the comparison to identify when there is more than a predetermined distance between relative positions of the microscopic features and the second microscopic features in the second image, in response to which the controller provides second signals to move the movable spindle.

9. The system of claim 7, wherein the matched operations comprise matched drilling operations.

10. The system of claim 7, wherein the controller is further configured to provide signals to move the movable spindle to a series of predetermined positions for performing operations on the first workpiece.

11. The system of claim 10, wherein the controller is further configured to:
receive, from the microscopic camera at each of the predetermined positions, an image of the template mounted to the second workpiece, and
identify the microscopic features of the template associated with each of the predetermined positions.

12. The system of claim 7, wherein the controller is further configured to identify a temperature differential of the template when mounted to the first workpiece and when mounted to the second workpiece wherein the distance between the microscopic features and the second microscopic features is determined based on the temperature differential.

13. A method for performing matched operations on mating a first workpiece and a second workpiece, the method comprising:
moving a first spindle having a first chuck for holding a first tool to a series of predetermined positions for performing operations on the first workpiece;
capturing an image of a template mounted to the first workpiece using a microscopic camera mounted on the first spindle at each of the predetermined positions;
identifying and storing, in a memory, microscopic features of the template associated with each of the predetermined positions;
performing a comparison of the microscopic features with second microscopic features identified in a second image of the template mounted to the second workpiece; and
responsive to the comparison indicating a distance between the microscopic features and the second microscopic features that does not satisfy a threshold distance, providing second signals to move the first spindle such that the threshold distance is satisfied.

14. The method of claim 13, further comprising:
detachably mounting the template on a third workpiece;
moving a second spindle having a second chuck for holding a second tool to a series of predetermined positions for performing operations on the third workpiece;
capturing an image of the template mounted to the third workpiece using the microscopic camera mounted on the second spindle at each of the predetermined positions; and
identifying third microscopic features of the template associated with each of the predetermined positions for performing operations on the third workpiece.

15. The method of claim 14, further comprising performing a second comparison of the third microscopic features of the template associated with each of the predetermined positions for performing operations on the third workpiece with the microscopic features in a stored version of an image of the template associated with a corresponding predetermined position for performing an operation on the first workpiece.

16. The method of claim 15, further comprising:
providing signals to move the second tool installed in the second chuck on the second spindle to adjust a position the second tool based on the second comparison; and
performing operations at each of the predetermined positions on the third workpiece.

17. The method of claim 16, further comprising identify a temperature differential of the template when mounted to the first workpiece and when mounted to the second workpiece, wherein the distance between the microscopic features and the second microscopic features is determined based on the temperature differential.

18. A non-transitory computer readable medium storing instructions that, when executed by a processor, cause the processor to perform operations comprising:
moving a spindle having a chuck for holding a tool to a series of predetermined positions for performing an operation on a first workpiece;
capturing, at each of the predetermined positions, an image of a template mounted to the first workpiece using a microscopic camera mounted on the spindle;
identifying microscopic features of the template associated with each of the predetermined positions;
performing a comparison of the microscopic features with second microscopic features identified in a second image of the template mounted to a second workpiece; and
responsive to the comparison indicating a distance between the microscopic features and the second microscopic features that does not satisfy a threshold distance, providing second signals to move the spindle such that the threshold distance is satisfied.

19. The non-transitory computer readable medium of claim 18, wherein the spindle is part of a computer numerical control machine or a computer-controlled robot arm system.

20. The non-transitory computer readable medium of claim 18, wherein the operations further comprise initiating a drilling operation.

* * * * *